US008845225B2

(12) United States Patent
Schmidt et al.

(10) Patent No.: US 8,845,225 B2
(45) Date of Patent: Sep. 30, 2014

(54) FASTENING ARRANGEMENT FOR A WALL-SUPPORTED AND FLOOR-SUPPORTED ELEMENT OF AN INTERIOR FITTING OF A VEHICLE

(75) Inventors: Gerhard Schmidt, Essen (DE); Klaus Stoll, Niederkrüchten (DE)

(73) Assignee: Siemens Aktiengesellschaft, Munich (DE)

( * ) Notice: Subject to any disclaimer, the term of this patent is extended or adjusted under 35 U.S.C. 154(b) by 646 days.

(21) Appl. No.: 13/034,319

(22) Filed: Feb. 24, 2011

(65) Prior Publication Data
US 2012/0219352 A1 Aug. 30, 2012

(51) Int. Cl.
*B60N 2/075* (2006.01)
*F16B 7/18* (2006.01)
*B61D 17/18* (2006.01)
*B60N 2/07* (2006.01)
*B61D 33/00* (2006.01)
*B60N 2/015* (2006.01)

(52) U.S. Cl.
CPC ............ *B61D 33/0057* (2013.01); *B61D 17/18* (2013.01); *F16B 7/187* (2013.01); *B60N 2/0715* (2013.01); *B60N 2/01516* (2013.01); *B60N 2205/20* (2013.01)
USPC ......... 403/252; 403/254; 403/257; 248/298.1

(58) Field of Classification Search
CPC ..... B60N 2/0715; F16B 7/187; F16B 37/045; F16B 37/046
USPC ................... 403/52, 243, 252–254, 256–258; 248/225.11, 295.11, 298.1, 424, 429; 211/94.01, 94.02, 162; 296/65.02, 296/65.13, 65.14
See application file for complete search history.

(56) References Cited

U.S. PATENT DOCUMENTS

| 4,752,055 | A  | * | 6/1988 | Ishida et al. ............... 248/298.1 |
| 4,899,973 | A  | * | 2/1990 | Ishida et al. ............... 248/298.1 |
| 6,511,032 | B1 | * | 1/2003 | Lee .............................. 248/429 |
| 6,935,519 | B2 | * | 8/2005 | Lawson et al. ............. 211/94.02 |
| 6,942,440 | B2 | * | 9/2005 | Unverzagt et al. ............ 411/268 |
| 7,044,701 | B2 | * | 5/2006 | Herb ............................... 411/84 |
| 7,594,787 | B2 | * | 9/2009 | Womack et al. ............. 410/104 |
| 7,669,723 | B2 | * | 3/2010 | Kao ............................. 211/94.01 |
| 8,276,867 | B2 | * | 10/2012 | Hung .............................. 403/52 |
| 2009/0289485 | A1 | * | 11/2009 | Walter et al. ............... 297/344.1 |

FOREIGN PATENT DOCUMENTS

| DE | 195 47 095 A1 | 6/1997 |
| DE | 10 2008 039 165 A1 | 2/2010 |
| EP | 0 962 355 A2 | 12/1999 |

* cited by examiner

*Primary Examiner* — Daniel P Stodola
*Assistant Examiner* — Josh Skroupa

(57) ABSTRACT

A fastening arrangement for a wall-supported and floor-supported element of an interior fitting on the side wall of a rail vehicle is provided. A C-section rail is arranged on the side wall for receiving sliding blocks to which the element is releasably screwed. The element is provided with a shaped part which at least partially encompasses the C-section rail and extends in the longitudinal direction of the C-section rail. The shaped part is supported on at least both of its ends on the outside of the C-section rail for absorbing vertical loads and moments, and, for absorbing the longitudinal and transverse forces acting on the shaped part, the shaped part is connected to at least one sliding block which is arranged between both ends of the shaped part in the C-section rail.

7 Claims, 3 Drawing Sheets

FASTENING ARRANGEMENT FOR A WALL-SUPPORTED AND FLOOR-SUPPORTED ELEMENT OF AN INTERIOR FITTING OF A VEHICLE

FIELD OF INVENTION

The invention relates to a fastening arrangement for a wall-supported and floor-supported element of an interior fitting of a vehicle, in particular a passenger seat on the side wall of a rail vehicle, comprising at least one C-section rail which is arranged on the side wall in the horizontal extension for receiving sliding blocks to which the floor-supported element may be releasably screwed on the wall side.

BACKGROUND OF INVENTION

Fastening arrangements of the type described above are known in order to fix passenger seats, but also tables and other device elements, in vehicles, said elements being retained on the side wall or the basic structure of the vehicle carrying the side wall and being additionally supported on the floor of the vehicle. Previous configurations of systems use at least two connection points in the side wall region for the element to be fixed, said connection points being arranged one behind the other in the longitudinal direction of the vehicle, as a result of which—as intended—support moments may be transmitted about the transverse axis, but also a greater rigidity is produced about the vertical axis. Even a slight displacement of the elastically mounted floor plate relative to the side wall of the vehicle leads to distortions, which result in damage to the fastening points of the elements.

To this end, and in order to prevent damaging distortions, elastic elements such as rubber bushes have already been used at the connection points. As, however, there is frequently the requirement to fasten the elements, in particular seat benches or tables, in an adjustable manner in order to permit a more flexible use of space, it might be proposed to fasten the elements in profiled rails with sliding blocks which, after the release of the sliding blocks, permit a displacement of the elements in the longitudinal direction of the vehicle. Due to the high loads and the problem of distortions, indicated above, which occur with relative movements between the vehicle structure and the floor plate, however, a direct fastening in the C-section rails is only possible with difficulty, and the components would be disadvantageously bulky and/or complicated and thus cost-intensive. An example of this may be derived from DE 195 47 095 A1, the solution disclosed therein being costly and complicated as a whole.

SUMMARY OF INVENTION

It is an object of the present invention to provide a simple, stable fastening arrangement which nevertheless may be used in a flexible manner, for a wall-supported and floor-supported element of an interior fitting of a vehicle, in particular a passenger seat in a vehicle (rail, road or water vehicle), in which a high load-bearing capacity is permitted without distortions between the floor support and the C-section rail provided for fastening to the wall.

The object is achieved by proposing that the element is provided with a further shaped part which at least partially encompasses the C-section rail in the installed state and extends in the longitudinal direction of the C-section rail, said shaped part being supported on at least both of its longitudinal ends on the outside of the C-section rail for absorbing vertical loads and moments, and that for absorbing the longitudinal and transverse forces acting on the profiled rail, the shaped part may be connected to at least one sliding block which is arranged between both longitudinal ends of the shaped part in the C-section rail, and wherein both longitudinal ends of the shaped part are arranged with a distance from the at leadt one sliding block and th C-section rail.

The fastening arrangement is characterized by the direct mounting of the element, for example the passenger seat, to the C-section rail, the vertical loads and the moments about the transverse axis (Y-axis) being directly supported via the second profiled rail on functional surfaces on the outside of the C-section rail. The C-section rail is thus either fixedly connected to the side wall of the vehicle or is itself part of the basic structure of the vehicle. In the known manner, sliding blocks are used for fastening the profiled rail, which bears the element and is fastened thereto, to the C-section rail of the side wall.

According to a particular feature of the invention, it is proposed that the shaped part, which encompasses the C-section rail and is fastened to the element, has a U-shaped cross section and encompasses the C-section rail with its two U-shaped arms which are open in the direction of the C-section rail. With such a design of the fastening arrangement, the forces to be applied may be distributed very evenly, without costly structures being required.

In order to solve the problem of distortions caused by relative movements between the vehicle floor, on which the element is supported, and the side wall, according to a further feature of the invention it is proposed that elastic intermediate layers are provided between the C-section rail and the shaped part encompassing said C-section rail, at least in the region of the supporting ends of the shaped part, for distributing the support loads acting there.

A further proposal of the invention serves the same purpose and provides that the shaped part arranged on the element is retained on the C-section rail by means of a fastening element formed by the sliding block and a clamping body positively penetrating the shaped part, the fastening element directly encompassing the C-section rail and an elastic intermediate layer being provided between the shaped part and the fastening element.

In an embodiment of the invention, the fastening element penetrating the shaped part may be surrounded by a rubber sleeve which is inserted into the shaped part.

In order to achieve equal load distribution and thus optimum use of frictional forces, according to a further feature of the invention it is proposed that the contact surfaces of the intermediate layer with the sliding block and the clamping body are of the same size.

The forces and moments are reliably absorbed and distributed by means of the U-shaped profiled rail which encompasses the C-section rail, and which is arranged on the element to be fastened, for example a passenger seat of a rail vehicle, and bears against the C-section rail with the rubber supports arranged at least at both ends of the profiled rail. Forces which act in the longitudinal and transverse directions of the profiled rail are directly absorbed by the fastening device on the C-section rail, the elastic intermediate layer (rubber sleeve) between the profiled rail and the fastening element preventing distortions, without impairing the clamping action on the C-section rails. In contrast, by directly mounting the element via the profiled rail on the C-section rail of the side wall, vertical loads and moments about the transverse axis are supported on functional surfaces of the C-section rail.

By means of the fastening element, arranged between the ends of the profiled rail and consisting of the sliding block and the clamping body, the frictional force on the clamping surfaces of the C-section rail may be utilized on both sides. The longitudinal forces acting on the profiled rails are uniformly distributed via the elastic intermediate layers. Relative to a conventional single-shear connection, for preventing the element slipping in the longitudinal direction, only half the total screw pre-stressing forces are required.

None of the elastic intermediate layers is located in the relevant load path of the distortion of a screw connection. The pre-stressing force thereof thus does not depend on the setting behavior of the intermediate layers. All elastic intermediate layers are secured in a fully redundant manner by the positive connection of the metal parts. The elastic intermediate layers are thus not relevant to safety, and thus may be dimensioned solely according to the operating load (for example weight of seat bench and passengers) and the thermal and mechanical decoupling.

BRIEF DESCRIPTION OF THE DRAWINGS

An exemplary embodiment of the invention is described hereinafter with reference to the drawings, in which.

DETAILED DESCRIPTION OF INVENTION

Figure 1:
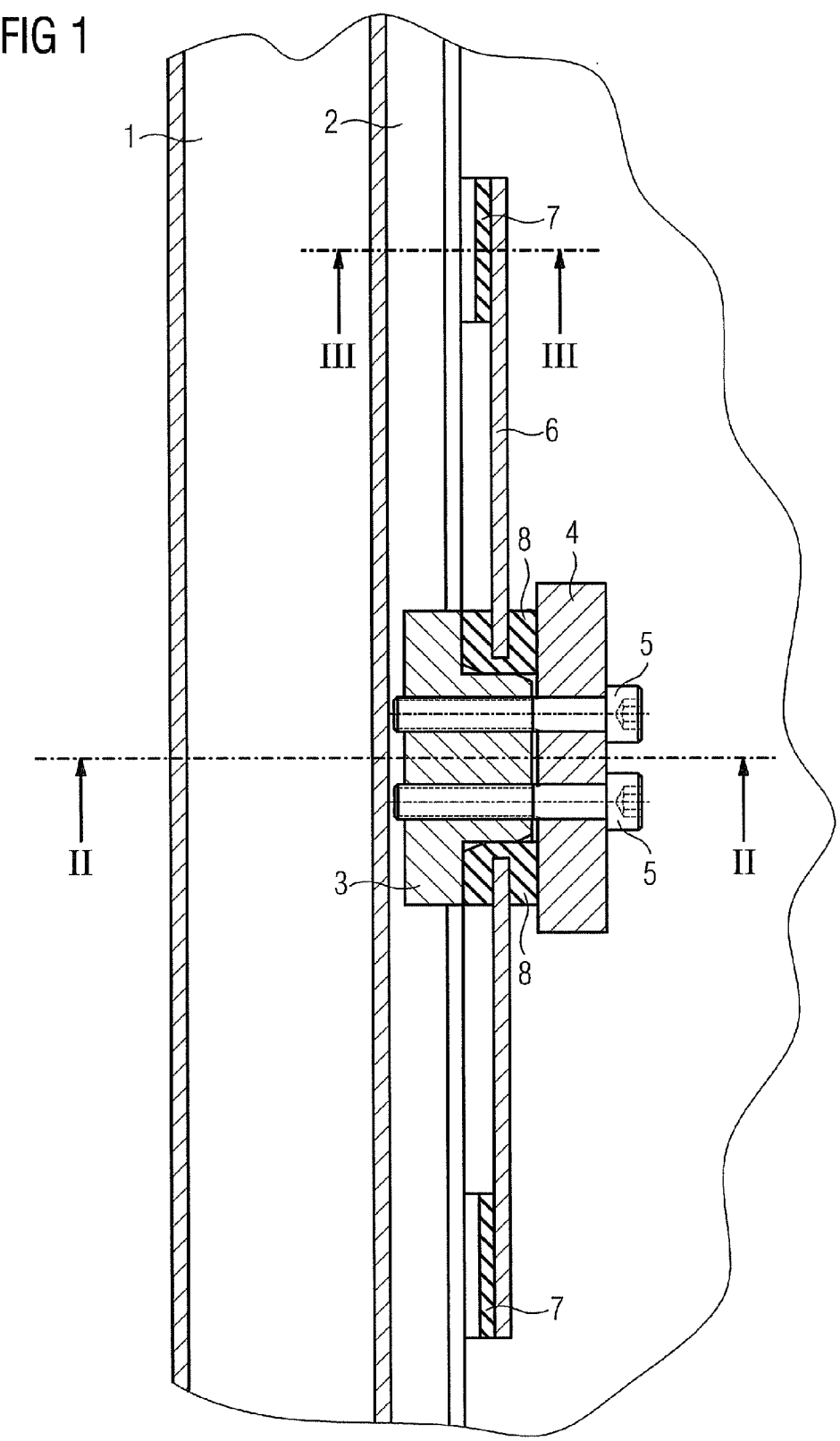
FIG. 1 shows a longitudinal section through the side wall of a rail vehicle in the region of a C-section rail for fastening a passenger seat.

FIG. 1 shows a longitudinal section through the side wall of a rail vehicle in the region of the fastening of a passenger seat to a C-section rail. The side wall of the rail vehicle is denoted by 1 and consists of a structure with an integrally formed C-section rail 2. The C-section rail 2 extends substantially horizontally relative to the longitudinal axis of the rail vehicle; the C-section is open towards the interior of the vehicle. A sliding block 3 is displaceably arranged in the known manner in the C-section rail, said sliding block serving for fastening a passenger seat (not shown). To this end, the passenger seat is connected to a shaped part 6 aligned in the direction of the C-section rail 2, said shaped part being designed to be U-shaped in cross section (FIG. 2) and encompassing the C-section rail 2 with the arms of the U-section open towards the side wall 1 (FIG. 3). The shaped part 6 is retained by means of the clamping body 4 on the C-section rail 2, for which the clamping body 4 may be screwed to the sliding block by means of the screws 5. The clamping body 4 is, in turn, connected to the shaped part 6 via an elastic intermediate layer, whilst, in the same manner as the sliding block 3, when the screws 5 are tightened, said clamping body comes to bear directly against the functional surfaces of the C-section rail 2 located opposite the sliding block 3 and fixes the element connected to the shaped part 6 by clamping.

The shaped part 6 bears at both its ends with elastic intermediate layers 7 against the outside of the C-section rail 2 and is, as a result, able to absorb support forces acting vertically to the C-section rail 2 and to transmit said forces to the C-section rail 2. Forces acting transversely, and in the installed position horizontally, to the C-section rail 2 and moments acting in the same direction are absorbed by the fastening element which is formed by the clamping body 4 and the sliding block 3, and which is, on the one hand, rigidly connected to the C-section rail 2 by clamping and, on the other hand, permits slight movements by the elastic connection to the shaped part 6.

Figure 2:
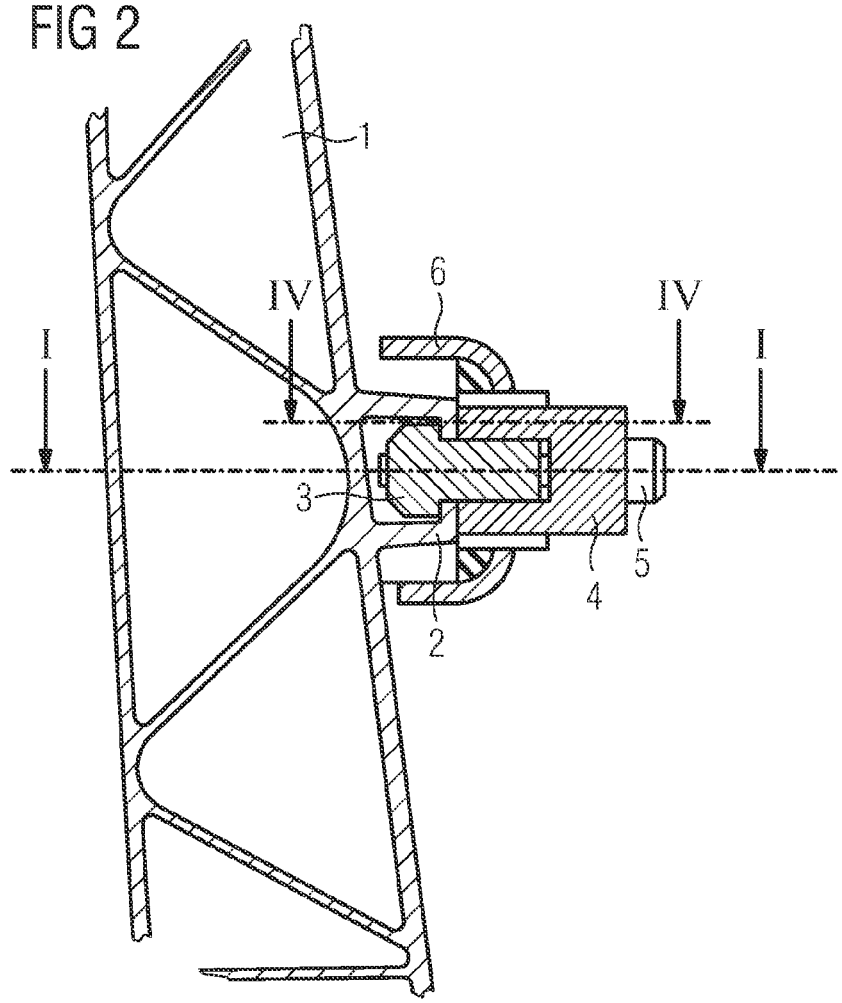
FIG. 2 shows a cross section through the C-section rail along the cutting plane II-II in FIG. 1.
Figure 3:
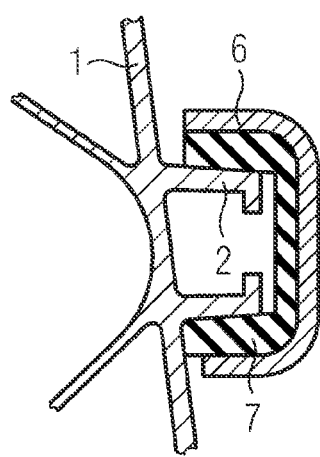
FIG. 3 shows a cross section through the C-section rail along the cutting plane III-III in FIG. 1.

In a cross section along the cutting plane II-II of FIG. 1, the fastening of the shaped part 6 to the C-section rail 2 may be seen in FIG. 2. The sliding block 3 may be seen and said sliding block engages behind the C-section from inside and may be screwed to the clamping body 4 via the screws 5 so that both parts press from inside and outside against the functional surfaces of the C-section rail 2 and retain the fastening element formed by the sliding block and the clamping body.

As is revealed by FIG. 3, the shaped part 6 is partially provided at the end regions with elastic intermediate layers 7 which on both sides (from above and below) press against the C-section from the outside, the shaped part 6 which encompasses the C-section rails and which is U-shaped in cross section being retained by the fastening element 3, 4.

Figure 4:
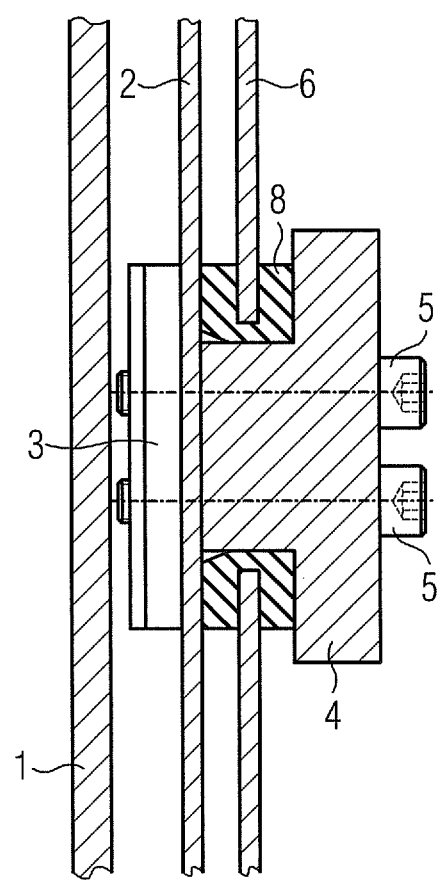
FIG. 4 shows a longitudinal section through the C-section rail along the cutting plane IV-IV in FIG. 2.

As is revealed by FIG. 4, which shows a cross section through the fastening element along the cutting plane IV-IV in FIG. 2, the shaped part 6 is elastically connected to the fastening element 3, 4, by the clamping body, on the one hand, and the sliding block, on the other hand, penetrating the shaped part 6, the opening being provided with an elastic intermediate layer 8, in which the shaped part 6 is embedded. In this manner, forces which act between the C-section rail 2 and the U-shaped profiled rail 6, encompassing said C-section rail, are elastically absorbed without the fastening itself being weakened.

In contrast, by the direct clamping of the sliding block 3 and clamping body 4 to the clamping surfaces of the C-section rail 2 and the elastic support of the shaped part 6 on the C-section rail, a secure fastening is ensured which guarantees the fastening of the passenger seat, even if the elastic elements were to be removed. By means of the invention, a very simple and flexible fastening of a passenger seat in a rail vehicle is achieved, said fastening being easily displaceable by releasing the screws 5, meeting all safety requirements and reliably eliminating damaging distortions between the fastening elements in the event of relative movements between the wall element and the floor plate.

The invention claimed is:

1. A fastening arrangement on a side wall of a rail vehicle, comprising:
   a C-section rail, arranged on the side wall in horizontal extension, the C-section rail receiving sliding blocks, and
   a shaped part which at least partially encompasses the C-section rail and extends in a longitudinal direction of the C-section rail, the shaped part being supported on at least both of its longitudinal ends on an outside of the C-section rail in order to absorb vertical loads and moments,
   wherein the shaped part is connected to at least one sliding block in order to absorb longitudinal and transverse forces acting on the C-section rail, the at least one sliding block being arranged between both longitudinal ends of the shaped part in the C-section rail, and wherein both longitudinal ends of the shaped part are arranged with a distance from the at least one sliding block and the C-section rail
   wherein the shaped part is retained on the C-section rail by a fastening element formed by the at least one sliding block and a clamping body positively penetrating the shaped part,
   wherein the fastening element directly encompasses the C-section rail, and wherein an elastic intermediate layer is provided between the shaped part and the fastening element.

2. The fastening arrangement as claimed in claim 1, wherein the shaped part, which encompasses the C-section rail, has a U-shaped cross section and encompasses the C-section rail with two U-shaped arms which are open in a direction of the C-section rail.

3. The fastening arrangement as claimed in claim 2, further comprising:
   second elastic intermediate layers arranged between the C-section rail and the shaped part, at least in a region of the supporting ends of the shaped part, for distributing support loads.

4. The fastening arrangement as claimed in claim 1, further comprising:
   second elastic intermediate layers arranged between the C-section rail and the shaped part, at least in a region of the supporting ends of the shaped part, for distributing support loads.

5. The fastening arrangement as claimed in claim 1, wherein the fastening element penetrating the shaped part is surrounded by a rubber sleeve which is inserted into the shaped part.

6. The fastening arrangement as claimed in claim 5, wherein contact surfaces of the intermediate layer facing the sliding block and the clamping body are of a same size.

7. The fastening arrangement as claimed in claim 1, wherein contact surfaces of the intermediate layer facing the sliding block and the clamping body are of a same size.

* * * * *